UNITED STATES PATENT OFFICE.

EDWARD VICTOR ESPENHAHN, OF BRIGHTON, VICTORIA, AUSTRALIA.

TREATMENT OF GASES OBTAINED FROM COAL AND OTHER CARBONACEOUS FUEL.

1,315,219.   Specification of Letters Patent.   Patented Sept. 9, 1919.

No Drawing.   Application filed July 6, 1917. Serial No. 178,943.

*To all whom it may concern:*

Be it known that I, EDWARD VICTOR ESPENHAHN, a subject of the King of Great Britain, residing at 1 William Street, Brighton, in the State of Victoria, Commonwealth of Australia, have invented certain new and useful Improvements in the Treatment of Gases Obtained from Coal and other Carbonaceous Fuel, of which the following is a specification.

This invention relates to certain improvements in the treatment of gases obtained from coal and other carbonaceous fuel and refers more especially to the treatment of heating and illuminating gases containing cyanogen bearing compounds obtained from the distillation of coal in ordinary gas works or from the manufacture of coke in coke ovens.

This invention is also applicable to other gases which contain cyanogen bearing compounds (such as producer gas and blast furnace gases).

The object of this invention is to provide means for the recovery of cyanogen bearing compounds from such gases and also other by-products such as sulfate of ammonia. A further object of this invention is to provide a method of treatment which is cyclic in operation whereby the products of subsequent operations are reusable in the treatment of fresh supplies of crude gases.

Hitherto many attempts have been made to extract soluble ferro cyanids from coal and coke oven gases but up to the present these attempts have been more or less unsuccessful owing to the formation of insoluble compounds. These failures have been experienced both when the ammonia has been previously removed and when ammonia is present. In cases where ammonia has not been removed its presence, by slightly increasing the alkalinity, at first assists the absorption of the cyanogen-bearing substances, but after a certain point has been reached insoluble ferro-cyanids have been formed.

I have discovered that if the absorption of the cyanogen bearing substances is carried out at relatively high temperatures (say from 40° to 90° C. approximately the dew point) or at the temperature ordinarily employed for direct recovery and if the solution is maintained at a relatively high state of concentration approximately the point of saturation the formation of insoluble ferrocyanids is avoided irrespective of the presence of ammonia even if present in comparatively large proportions.

I accomplish the objects of this invention by providing a method of treatment which comprises submitting the gases at a relatively high temperature to treatment with a concentrated alkaline solution (such as sodium carbonate) containing sodium ferrous-ferro-cyanid in suspension until the solution becomes charged with sodium ferrocyanids; then allowing the solution to cool for the crystallization of the sodium ferrocyanid, then treating the sodium ferrocyanid thus obtained with an acid (such as sulfuric acid) for the formation of hydrocyanic acid (and subsequently alkaline cyanids) and sodium ferrous-ferro-cyanid which latter may be advantageously used with sodium carbonate for treating the crude gases in the first operation. The gases after the removal of the cyanogen bearing compounds and containing ammonia and sulfureted hydrogen may be passed through a solution of ferrous sulfate for the formation of ferrous sulfid for use in producing the sodium ferrous-ferro-cyanid.

This invention is applicable to the treatment of gases either by the "direct" or the "semi-direct" methods for the recovery of ammonia and may be applied either before or after the removal of the ammonia.

By way of example I will describe the treatment according to this invention of ordinary coke oven gases obtained from the destructive distillation of coal in which the recovery of the cyanogen bearing compounds is effected before the removal of the ammonia. The gases are first treated in the ordinary centrifugal or other washers for the removal of tar fog and without cooling are led into washers preferably of the centrifugal type at a temperature of approximately the dew point of the gases (*i. e.* from 40° C. to 90° C.) and while still at that temperature are brought into intimate contact with a washing liquor, which consists of a concentrated solution of sodium carbonate in which sodium ferrous-ferro-cyanid is held in suspension. The production of this sodium ferrous-ferro-cyanid may be effected in the first instance by submitting the gases to washing with a solution of sodium carbonate in which ferrous sulfid is held in suspension forming sodium ferro-cyanid which is decomposed by sulfuric acid to form sodium ferrous-ferro-cyanid. The extent of concentration of this solution of sodium carbonate is obtained by adding the requisite quantity of such reagent as calculated to obtain subsequently a concentrated solution of sodium carbonate and sodium ferro-cyanid. I have found in practice that a solution made up by dissolving four lbs. of dehydrated sodium carbonate per gallon of water well answers the purpose. In practice preferably two or more separate tanks or containers of this washing liquor are maintained so that as one is being withdrawn the other is in circulation. The gases are caused to pass through the said liquor while the same is maintained in a constant state of agitation by the centrifugal action of the washer. The temperature is maintained at or about the dew point of the gases by the admission of steam or other heating medium as may be found necessary. In practice sodium ferrous-ferro-cyanid may be added from time to time to maintain the reaction which is in accordance with the following equation:—

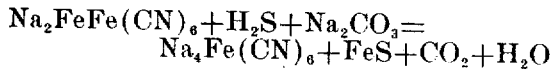

When the liquor contained in one storage tank has become sufficiently charged with sodium ferro-cyanid the liquor contained in the second tank is by-passed into the first gas washer and the first mentioned liquor is withdrawn and the sludge separated from the clear liquor such as by filter pressing or the like. The clear liquor is then allowed to cool when pure crystals of sodium ferro-cyanid are formed. The clear liquor is returned to the washing storage tank after having been renewed by the addition of sodium carbonate and sodium ferrous-ferro-cyanid. The sodium-ferro-cyanid obtained as above is treated with sulfuric acid for the formation of hydrocyanic acid (and subsequently alkaline cyanids) in accordance with the following equation:—

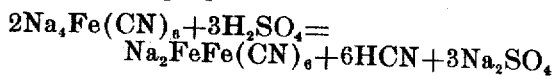

The hydrocyanic acid thus formed is used for producing alkaline cyanids in known manner. The sodium-ferrous-ferro-cyanid sludge formed as above is used again with sodium carbonate for washing the crude gases. The ferrous sulfid formed as above reacts with sodium carbonate and with the CN compounds in the gases for the formation of sodium ferro-cyanid according to the equation:—

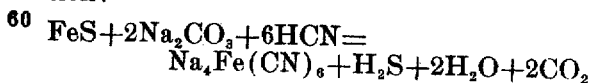

The gases after the removal of the cyanogen bearing compounds are caused to travel to ammonia saturators in which they are subjected to the action of sulfuric acid in the ordinary way for the formation of ammonium sulfate. Or alternatively such gases or a portion of such gases may be passed through a solution of ferrous sulfate for the formation of ammonium sulfate free from cyanogen bearing compounds and ferrous sulfid in accordance with the following equation:—

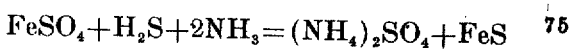

The ferrous sulfid obtained as above may be used in conjunction with sodium carbonate for washing the crude gases as above described for the formation of sodium ferro-cyanid.

Another example of this invention consists of its application to the treatment of gases in which the cyanogen bearing compounds are recovered after the removal of the ammonia. In this case the gases are treated in the ordinary way for the removal of the tar fog and ammonia and are then subjected to a washing treatment at a relatively high temperature (approximately the dew point of the gases) with a concentrated solution of sodium carbonate in which sodium ferrous-ferro-cyanid is held in suspension. The same reactions take place as described above producing sodium ferro-cyanid in solution. The liquors are treated for the separation of the sludge and the clear solution is allowed to cool for the precipitation of crystals of pure sodium ferro-cyanid. This sodium ferro-cyanid is treated with sulfuric acid for the formation of hydrocyanic acid and subsequently alkaline cyanids while the sodium ferrous ferro-cyanid formed is used with the concentrated solution of sodium carbonate for treating fresh supplies of the gases for the formation of sodium ferro-cyanid as previously described.

A certain portion of the gases before being led into the ammonia saturators is by-passed into another washer where the said gases containing ammonia and sulfureted hydrogen are caused to pass through a solution of ferrous sulfate for the formation of ammonium sulfate and ferrous sulfid. This ferrous sulfid may be used as above described for treating fresh gases with a concentrated solution of sodium carbonate for the formation of sodium ferro-cyanid.

I claim:

1. In the treatment of gases obtained by the heat-treatment of coal and other carbonaceous fuel, submitting the said gases at a relatively high temperature corresponding approximately to the dew point of the said gases, to a treatment with a concentrated solution of an alkali containing sodium ferrous ferro-cyanid in suspension.

2. The method of treating gases obtained by the heat-treatment of coal and other carbonaceous fuel, which comprises separating the tar fog; then submitting the said gases to a washing operation at a relatively high temperature corresponding approximately to the dew point of the said gases, with a concentrated solution of sodium carbonate containing sodium ferrous ferro-cyanid in suspension until the solution becomes charged with sodium ferro-cyanid, allowing the solution to cool until the sodium ferro-cyanid crystallizes out; treating the said sodium ferro-cyanid with acid for the formation of hydrocyanic acid and sodium ferrous ferro-cyanid; and washing a further amount of the said gases with a concentrated solution of sodium carbonate containing this sodium ferrous ferro-cyanid.

3. Method of treating gases obtained from coal and other carbonaceous fuel consisting of first treating the said gases for the removal of the tar fog; treating such gases for the absorption of ammonia; submitting the gases to treatment with a concentrated solution of sodium carbonate containing sodium ferrous ferro-cyanid in suspension until the solution becomes charged with sodium ferro-cyanid; allowing the said solution to cool until the sodium ferro-cyanid crystallizes out; treating the said sodium ferro-cyanid with acid for the formation of hydrocyanic acid and sodium ferrous ferro-cyanid; and utilizing such sodium ferrous ferro-cyanid for treating fresh gases in conjunction with a concentrated solution of sodium carbonate.

4. In the treatment of coal gas, coke oven gas and the like, the process of recovering cyanogen compounds contained therein, which comprises passing such gas, while warm, into contact with a concentrated solution of an alkali containing an iron compound capable of uniting with the said cyanogen compounds.

5. In the treatment of coal gas, coke oven gas and the like, the process of recovering cyanogen compounds contained therein, which comprises passing such gas, while warm, into contact with a concentrated solution of an alkali containing an iron compound capable of uniting with the said cyanogen compounds, and thereafter removing a cyanogen-alkali-iron compound from the liquor and regenerating therefrom an iron compound suitable for use in the first part of the process.

6. The step of treating cyanogen-containing gas with a concentrated solution of soda containing in suspension an iron compound capable of reacting with the soda and the cyanogen of the gas to form sodium ferro-cyanid, said treatment being effected while said gas is maintained at approximately the dew point.

7. In the treatment of gases produced in the heat-treatment of coal, which gases contain cyanogen, the step of washing such gases with a liquor comprising sodium ferrous ferro-cyanid, suspended in a concentrated soda solution, while at about the dew point of the gases.

In testimony whereof I have signed my name to this specification in the presence of two subscribing witnesses.

EDWARD VICTOR ESPENHAHN.

Witnesses:
J. L. CULLEN,
LUCY M. GREEN.